INVENTOR
MELVIN A. PEARSON
BY Herbert A. Minturn
ATTORNEY

INVENTOR
MELVIN A. PEARSON

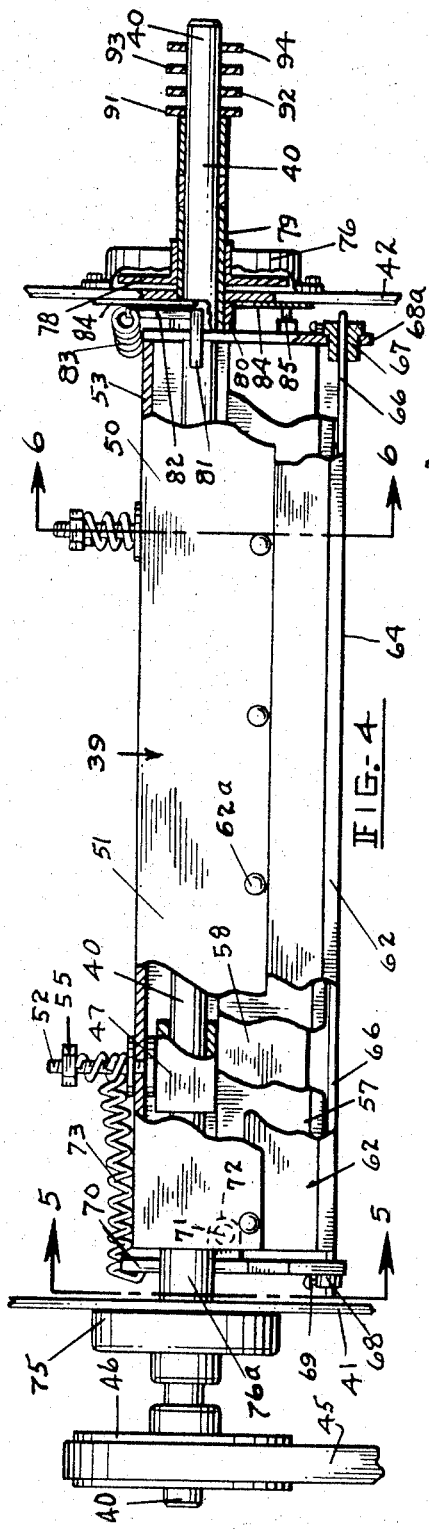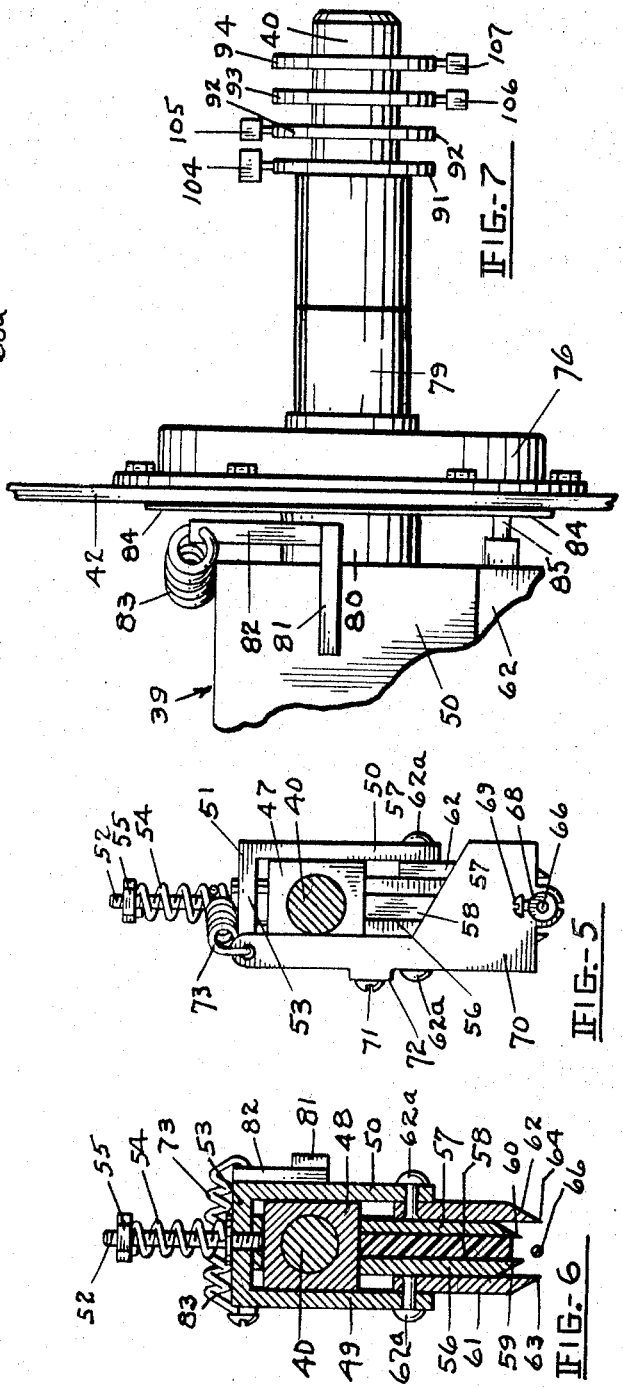

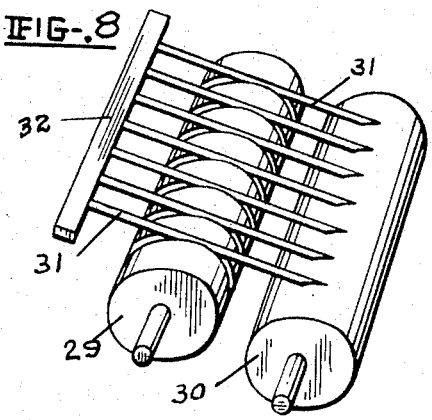
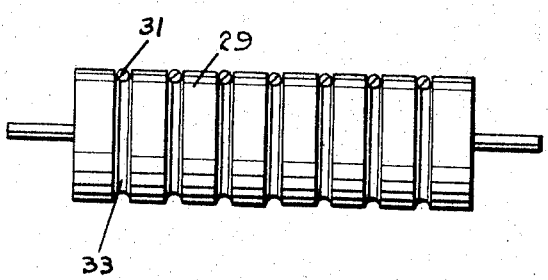
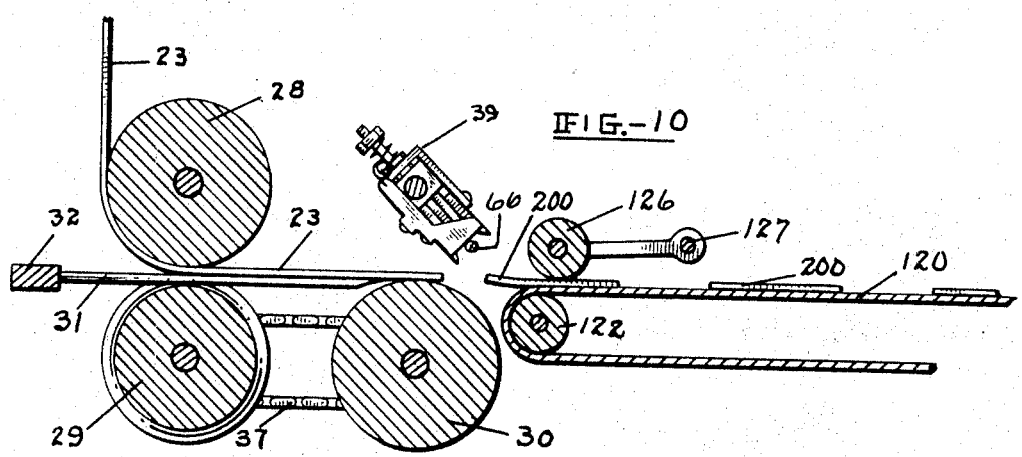
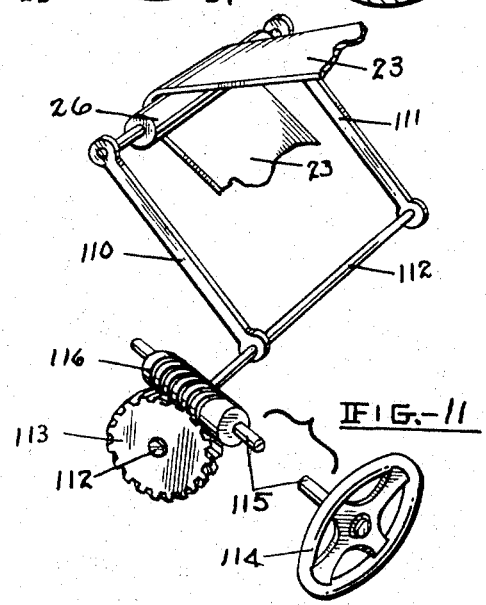

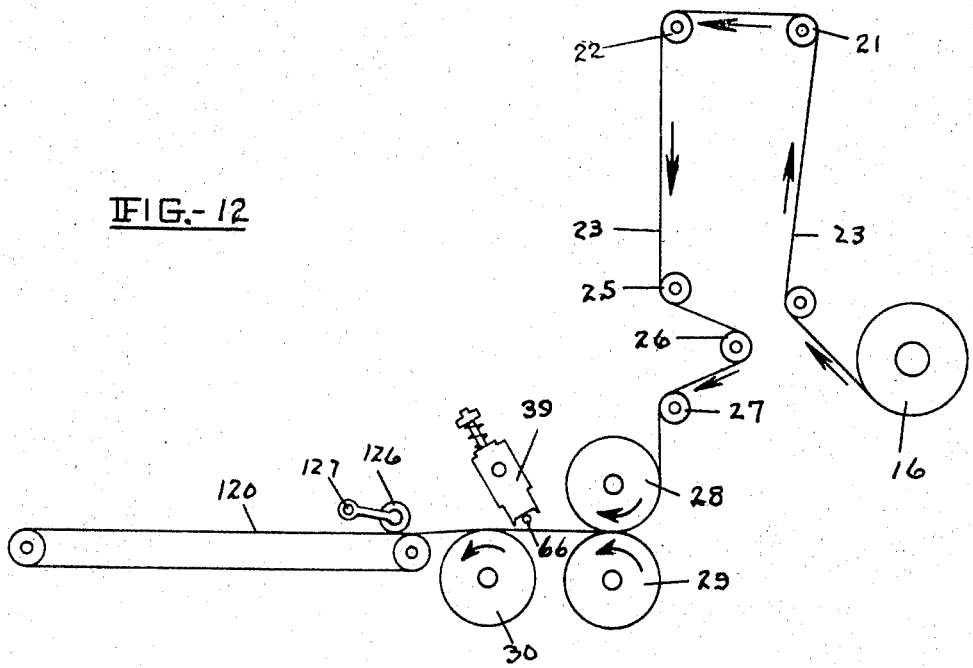
FIG.-12
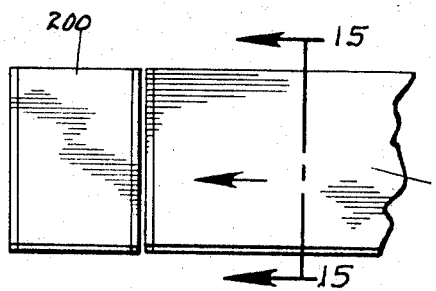
FIG.-14
FIG.-15

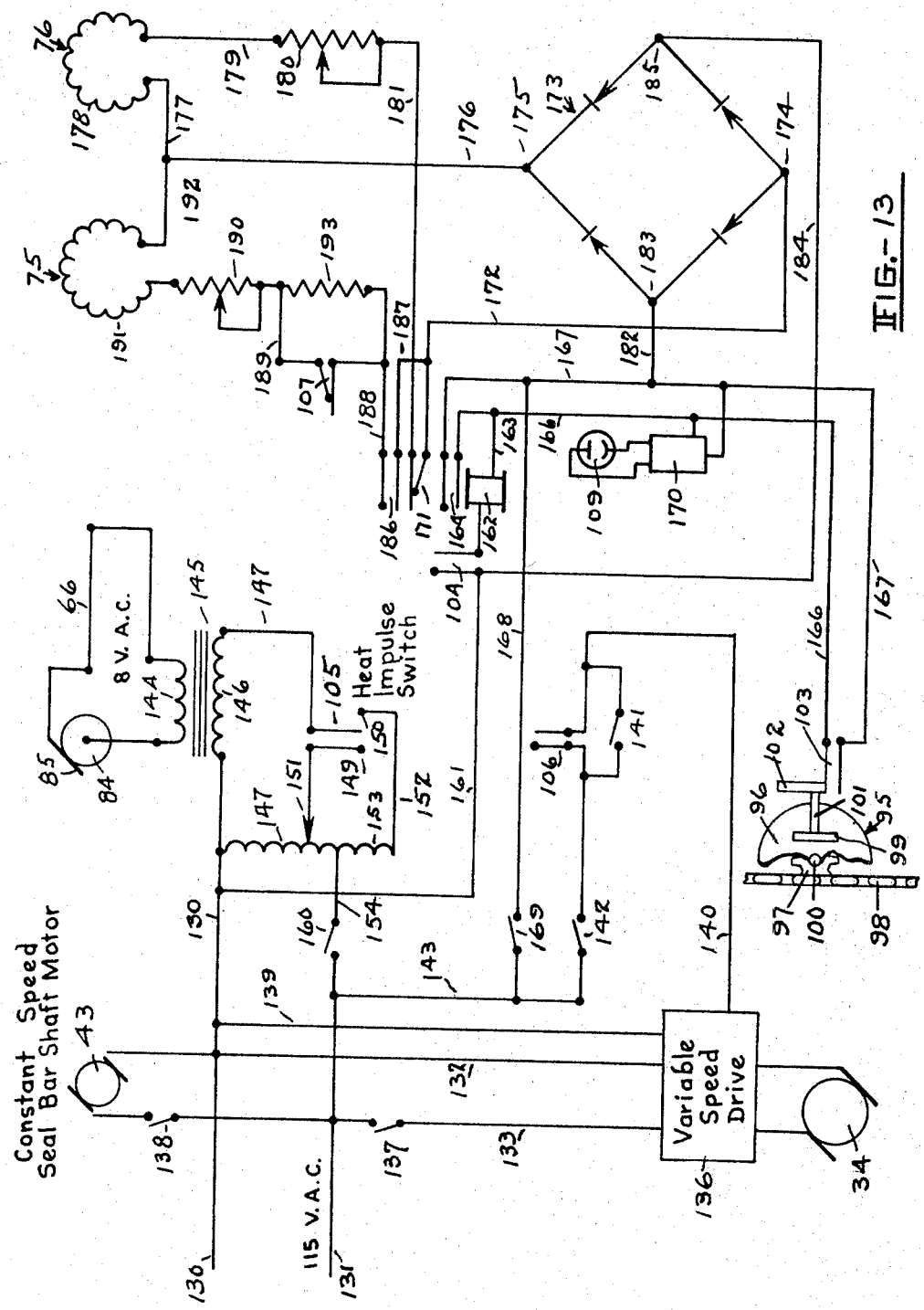

United States Patent Office 3,451,870
Patented June 24, 1969

3,451,870
CONTINUOUS PLASTIC BAG MAKING MACHINE
Melvin A. Pearson, Indianapolis, Ind., assignor, by mesne assignments, to Capital Paper Company, Indianapolis, Ind., a corporation of Indiana
Filed Aug. 24, 1964, Ser. No. 391,533
Int. Cl. B32b 31/18, 31/04; B31b 21/60
U.S. Cl. 156—250
9 Claims

ABSTRACT OF THE DISCLOSURE

A machine continuously making heat sealed members such as bags from a tape of at least a two ply thickness of a thermoplastic film, wherein the tape is continuously fed over a rotating member and extends by a forward end portion therebeyond; a heated wire is brought down across and against the tape over said member to melt together in a line the plies thereof; and while the molten state exists, pulling the forward end portion away from said tape, at a faster speed than that of the tape behind the melted line; the melted film portion flowing to make a seal between the plies on both the tape advancing end and the trailing end of the severed portion.

---

This invention relates to a machines for making plastic bags, particularly polyethylene bags in a continuous process without having to intermittently stop and set into action the machine while the bag is being sealed. The machine in question takes a sheet of plastic from a roll, the plastic being folded around one linear edge and is drawn from the roll in a flat condition. As this folded film passes through the machine, an electrically heated wire is brought around to seal the two plies of the film one to the other, the wire following the travel of a roll over which the plastic is carried.

The invention resides in the machine for carrying out that process.

A primary object of the invention is to provide a mechanism which will automatically take care of all of the steps required in making the bag from the roll of film to the finished bag.

A still further important object of the invention is to provide a centering mechanism whereby printed matter on the film of plastic may be centered in respect to the individual bags being made therefrom.

A still further important object of the invention resides in a mechanism for controlling the lengths of the bags.

An important object of the invention is to form a neat and durable seal on the sides, or the ends as the case may be of the bags, these seals having sufficient strength to permit the bags to be utilized for carrying predetermined matter without tearing or letting loose in the seals.

An overall advantage is found in the comparative simplicity of the machine with relatively few parts; therein the machine presents a neat, workmanlike design which in itself promotes long life of the machine and its parts.

These and many other objects and advantages of the invention will become apparent to those versed in the art from the following description of one particular form of the machine which is illustrated in the accompanying drawings, in which FIG. 1 is a view in front perspective of a machine employing the invention;

FIG. 4 is a view on an enlarged scale in front elevation and in partial section;

FIG. 5 is a view in transverse section on the line 5—5 in FIG. 4;

FIG. 6 is a view in transverse section of the line 6—6 in FIG. 4;

FIG. 7 is a view on an enlarged scale of the righthand end of the mechanism shown in FIG. 4;

FIG. 8 is a detail in top perspective of the film feed rolls;

FIG. 9 is a view of a feed roller in side elevation;

FIG. 10 is a detail in vertical section through the feeding and sealing mechanism;

FIG. 11 is a detail in perspective illustrating the registering mechanism;

FIG. 12 is a diagram of the travel of the plastic material through the mechanism;

FIG. 13 is a wiring diagram of the electrical control system;

FIG. 14 is a view in top plan of an end portion of a tape with a severed bag; and FIG. 15 is a transverse section on the line 15—15 in FIG. 14.

Figure 1:
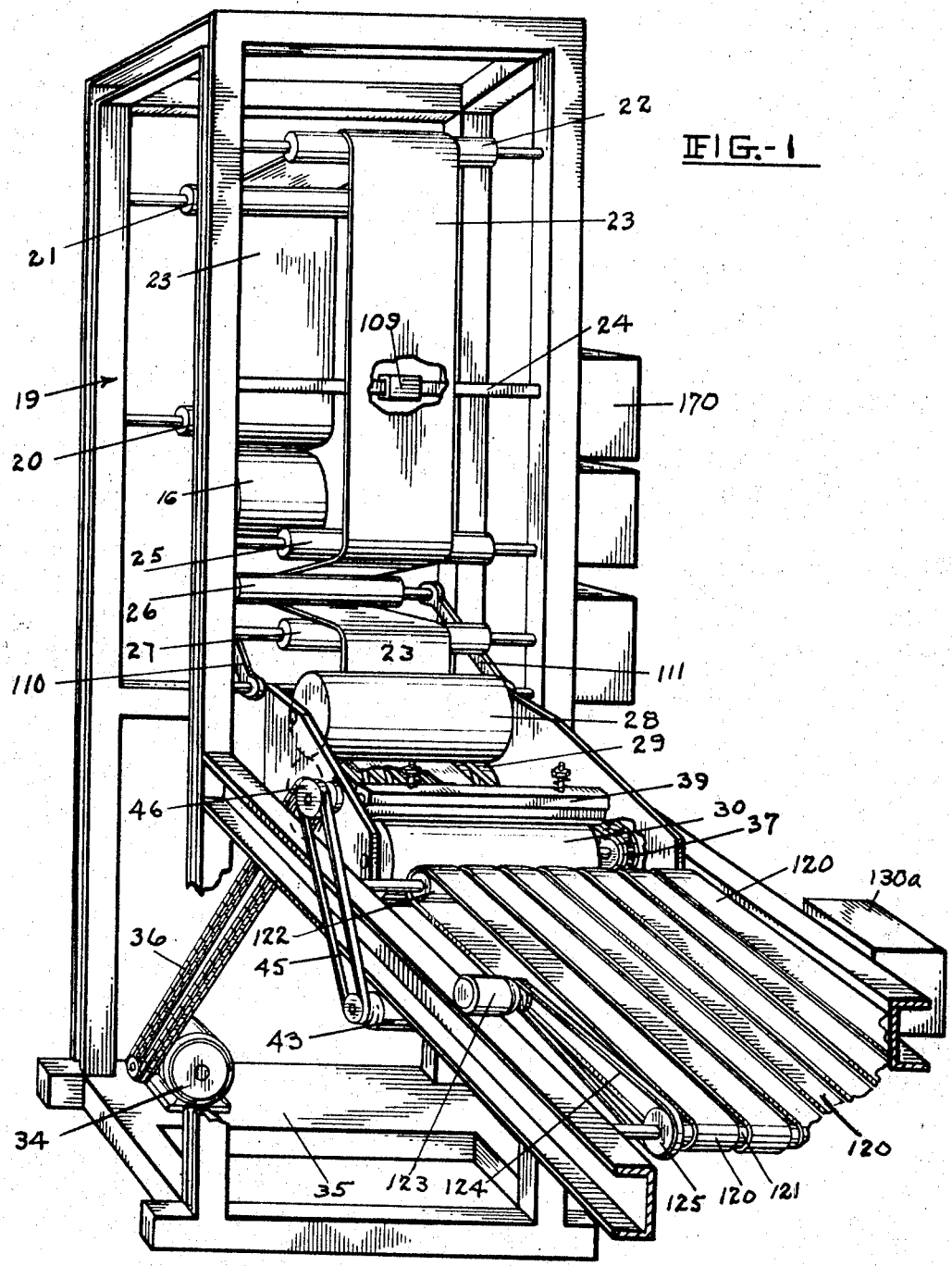
Figure 2:
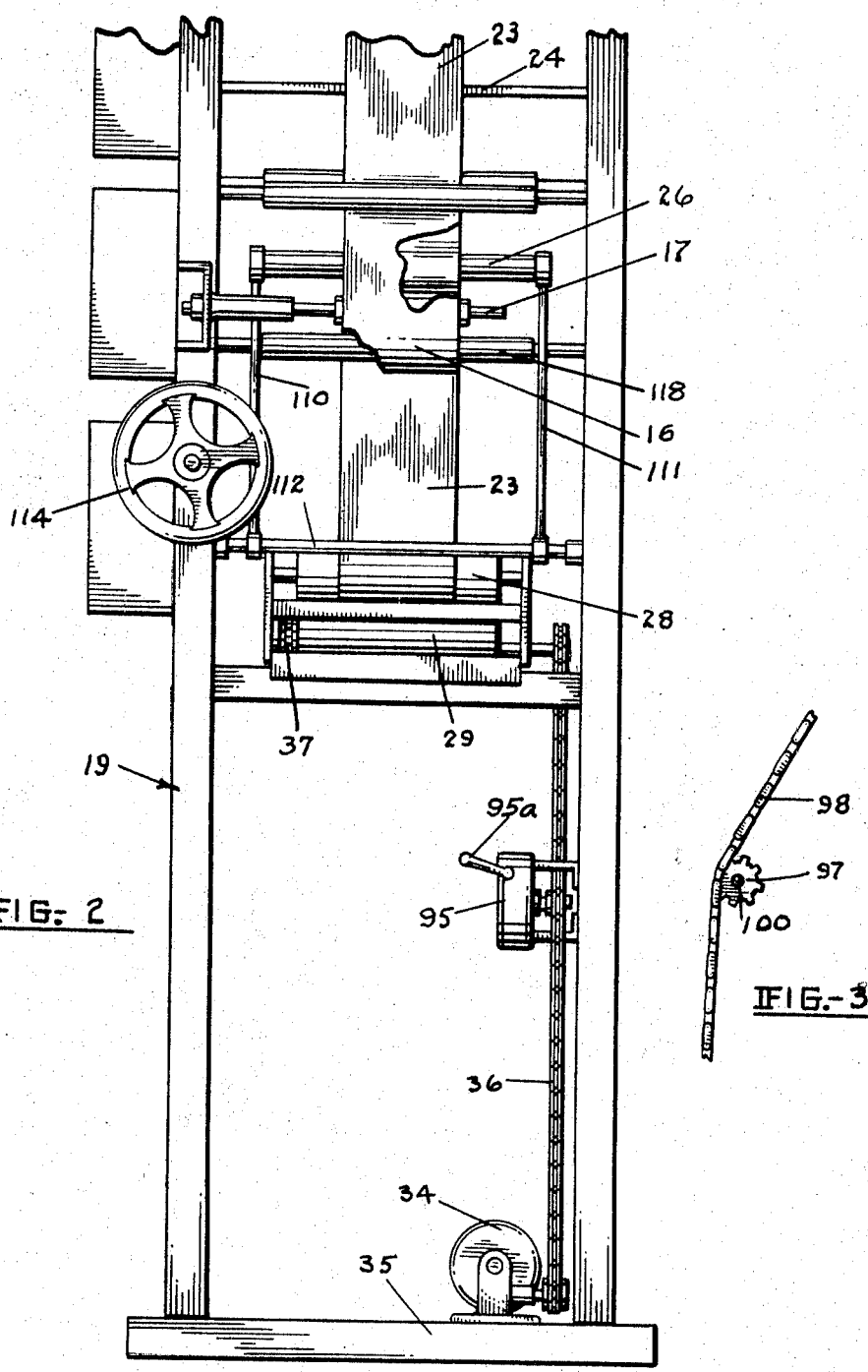
FIG. 2 is a fragmentary view in rear elevation.

Referring first to FIGS. 1 and 2, a roll 16 of the plastic film is revolubly carried on a spindle 17 in turn carried by the machine frame generally designated by the numeral 19. The plastic material hereinafter designated as a tape and identified by the numeral 23 leads from the roll forwardly and upwardly around a guide roller 20 to extend substantially upwardly and be carried around a top roller 21, thence forwardly to a front roller 22, downwardly in front of a photoelectric cell 109 carried by a bar 24 in turn mounted at the front side of the frame 19, and the tape 23 is carried downwardly around a roller 25, thence rearwardly and forwardly over and around an adjusting roller 26, forwardly over a roller 27 mounted on a fixed axis, and thence downwardly around and between draw rollers.

One of these draw rolls, roll 28 as an example, is vertically adjustable so as to control the pressure between it and the under roller 29 upon the tape 23 being drawn therebetween. This tape 23 leaves the rollers 28, 29 and extends substantially horizontally across and over the top of a seal roller 30. In order to facilitate the carrying of the tape 23 to the seal roller 30, a plurality of fingers, FIG. 8 designated by the numeral 31, herein shown as seven in number, the number of course depending upon the width of the tape, are fixed to a crossbar 32 and extend forwardly across grooves 33 provided around the roller 29 as best indicated in FIG. 9. These fingers 31 traverse the roller 29 and terminate just short of the upper side of the seal roller 30, FIG. 10. Thus the fingers 31 guide the tape 23 to the seal roller 30 so that it will not drop downwardly between it and the roller 29.

An electric motor 34 is mounted in any suitable position herein shown as on a base member 35 of the frame 19, and by means of a chain 36 drives the roller 29, and in turn the seal roller 30 is driven from that roller 29, by means of a chain 37. The seal roller 30 is driven at a slightly increased rate of speed in comparison to the speed of revolution of the roller 29. While not herein shown, this difference in ratio of speeds is in the present form secured by the chain 37 passing over a sprocket having one tooth less than that of the sprocket carried by the roller 29. This increase in speed of the seal roller 30 is made to set up a slight tension in the tape 23 without stretching it to any degree which will cause a variation in size of bags to be formed.

There is associated with the seal roller 30 a heater bar assembly generally designated by the numeral 39, FIGS. 4–7. This assembly 39 is mounted on a continuously turning shaft 40. The shaft 40 is supported in any suitable manner, by bearings (not shown) carried by end plates 41 and 42. The shaft is continuously turned by a motor 43 carried by a forward end of the frame 19, the motor 43 driving the shaft 40 by a belt 45 engaging around a pulley 46 in turn fixed to the shaft 40.

In the assembly 39, there is a bearing member 51 having two spaced apart legs 49 and 50 downturned from an intervening top web 53 forming an inverted U-channel. Two bearing blocks 47 and 48 are within the channel. Each block is located toward opposite ends of the assembly. These blocks 47 and 48 are slidingly engaged between the downturned legs 49 and 50. Each block 47 and 48 has fixed thereto an upwardly extending, threaded post 52.

The post 52 in each instance extends freely through the top web 53 of the member 51 and has a spring 54 encircling it, a nut 55 being provided on the post as a means for adjustably fixing the pressure of the spring 54 between the nut 55 and the top side of the web 53. In other words, the springs 54 are employed as yielding means to normally keep the blocks 47 and 48 in their uppermost positions between the legs 49 and 50. Thus, the blocks 47 and 48 being fixed vertically by reason of the shaft 40 passing through both of them, the member 51 may be relatively pushed upwardly in respect to the blocks 47 and 48.

A pair of plates 56 and 57 are fixed by top edges to the under sides of the blocks 47 and 48 to extend downwardly therefrom in parallel relation and separated by an insulating strip 58 which terminates slightly above the lower sharp line edges 59 and 60 of those plates. The insulating separator 58 is held in the position indicated between these two plates 56 and 57 which have outside faces spaced inwardly one toward the other from the sides of the blocks 47 and 48.

Pressure bars 61 and 62 are slidingly held on the outsides of the two plates 56 and 57, being secured to the legs 49 and 50 in any suitable manner, herein shown as by rivets 62a. These two pressure bars 61 and 62 have lower edges terminating substantially in knifelike edges 63 and 64.

A heat wire 66 is engaged by one end (right hand side FIG. 4) through an insulating collar 67 carried by an end plate 68A on the end of the assembly 39 in a fixed manner. The wire 66 being fixed at that end, extends along between the edges 63 and 64 to be received through a collar 68, to which the wire 66 is anchored in any suitable manner, herein shown as by a set screw 69. This collar 68 is on the outside of the lower end of a rocker 70 which is pivoted to the assembly 39 by a screw 71 through an arm 72 of the rocker 70 to engage with the member 39. The upper end of the rocker 70 has a spring 73 engaged therewith and interconnected to the assembly 39. The spring 73 rocks the rocker 70 so as to keep the wire 66 under tension. This is necessary due to the fact that the wire 66 will expand when hot and contract when cold. It is necessary that the wire 66 be kept in a taut, straight line condition in order to effect a proper bag seal.

The assembly 39 is intermittently drivingly connected to the shaft 40 by means of an electrical clutch 75 and brought to rest quickly by an electrically operated brake 76. Since the clutch and the brake are commercially obtainable, and the details do not enter per se into the invention, such details are not herein shown. It is sufficient to point out that the clutch is mounted on the bearing support plate 41 by a fixed member. This clutch 75 connects and disconnects a sleeve 76a with the shaft 40. The sleeve 76a is fixed to the assembly 39 and is normally free to revolve on the shaft 40.

At the other end of the assembly 39, the brake 76 is employed to stop turning of the assembly 39 upon release of the clutch 75. The brake is fixed to the plate 42. When the brake is electrically energized a member 78 is stopped turning. This member is fixed to a sleeve 79 which is fixed to the assembly 39 and is revolubly carried on the shaft 40.

There is a collar 80 fixed to the sleeve 79 between the plate 42 and the assembly 39. An arm 81 is fixed to the collar 80 and extends longitudinally of the shaft 40 to be in the path of the member 50 of the assembly 39 with a slight clearance between the arm 81 and the member 50. A post 82 is fixed to the collar 80 and extends upwardly to have one end of a coiled spring 83 engaged therewith. The other end of the spring engages with the assembly 39 and yieldingly rocks the arm 80 against the member 50. When the brake 76 is energized the momentum of the turning assembly 39 upon release of the clutch 75, rocks the assembly 39 relative to the arm 81 increasing the tension on the spring 83. Then when the arm 81 comes to a complete stop, the assembly 39 will be rocked by the spring 83 to carry it to a stop against the arm 81. In this operation, the heater wire 66 is quickly spaced from the rotating seal roller 30 and held in that spaced relation pending another revolution of the assembly, as will be apparent in describing the operation hereinafter.

Four individual cams 91, 92, 93 and 94 are fixed to the shaft to turn continuously therewith.

Figure 3:
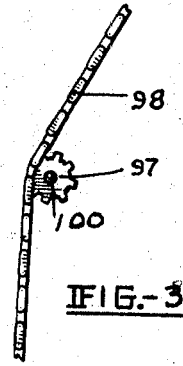
FIG. 3 is a detail of the drive for the bag length control.

A bag length determining mechanism is provided which mechanism 95, FIGS. 2 and 13, consists essentially of a disc, FIG. 13, which is continuously rotated by means of a sprocket 97, FIG. 3, constantly engaged with a flight 98 of the drive chain 36. A wheel 99 is in rotary contact with the face of the disc 96, and may be shifted toward and away from the axle 100 of the disc 96. In this manner, a variable speed drive is had through the shaft 101 which carries the small wheel 99 and rotates a cam 102 which operates a switch 103. The timing of the opening and closing of the switch 103 is varied by shifting the wheel 99 radially of the disc 96 by the lever 95a.

The cams 91, 92, 93, and 94 operate electrical switches 104, 105, 106, and 107 resepectively.

When a photoelectric cell 109 operates through nonregistry of printed matter (not shown) on the tape 23, registry may be secured by changing the length of travel of the tape 23. The means for so doing, FIG. 11, comprises the roller 26 which is rotatably mounted between a pair of arms 110 and 111 in turn fixed to a shaft 112 carrying a worm wheel 113 fixed thereon. A handwheel 114, FIGS. 2 and 11, is carried by the frame 19, herein shown as on the lefthand side thereof, and is mounted on a shaft 115 which carries a worm 116 in constant mesh with the worm wheel 113. Turning the handwheel 114 causes the shaft 112 to rotate, and in turn rock the arms 110 and 111 to vary the position of the roll 26 as between the idler rollers 117 and 118, FIG. 12, thereby varying the length of travel of the tape 23 flight accordingly.

A plurality of individual bag receiving belts 120 are carried around rollers 121 and 122. These belts are driven by any suitable means, herein shown as by the motor 123 through a belt 124 engaging around a pulley 125 on the roller 121. These belts are running in a direction away from the upper side of the seal roller 30 and receive thereon the individual bags 200, FIG. 10, coming from that roll. As indicated in FIG. 12, there is a weight roller 126 rockably carried on a shaft 127 so that the roller 126 may drop down on the top side, one roller for each belt 120 to supply sufficient weight on top of the bag 200 coming from the seal roller onto the belts 120 to cause the bag 200 in each instance to be carried along the top side of the belts 120. The rollers 126 have been omitted in FIG. 1 in order to prevent obscuring of other parts shown therein.

OPERATION

In operation, the tape is carried between the rollers 28 and 29 as above indicated, and across over the seal roller 30. The motor 34 is assumed to be in operation as is always the motor 43. Referring to the electrical diagram FIG. 13, the motor 43 is driven from the line composed of the wires 130 and 131, normally of 115 volts, alternating current. From these wires 130 and 131 lead the respective wires 132 and 133 to a variable speed drive control 136 and thence to the motor 34. This means that the tape 23 is traveling over the roller 30. There is a motor 34 control switch 137 provided.

The seal bar assembly 39 shaft 40 is driven by the motor 43 also individually controlled by a switch 138.

A wire 139 leads from the wire 130 through the variable speed control 136, from which a wire 140 completes a circuit between the manually controlled switch 141 or the switch 106 operated by the cam 93, through the main cutoff switch 142 and back through the wire 143 to the wire 131. The cam 93 is designed to hold the switch 106 closed during a complete cycle of operation for each bag made. Thus the circuit length described operates to maintain a fixed speed of the motor 34 during that cycle.

The heat wire 66 is in series in a circuit between the brush 85 and a secondary winding 144 of the transformer 145. The primary 146 of this transformer 145 is connected across the section of winding 147 of an auto-transformer, this winding 147 being interconnected with the wire 130. The primary winding 146 has a wire 147 leading to a switch 105 interconnecting between terminals 149 and 150. The terminal 149 connects to the variable member 151 and the transformer 147 while the terminal 150 connects to the wire 152 to the section of the transformer 153. Between the transformer sections 147 and 153, there is an interconnecting wire 154 leading through the control switch 160 to the line 131. In other words the windings 147 and 153 are parts of an auto-transformer.

The switch 105 is operated by the cam 92 to complete the circuit through the primary winding 146 selectively for high and low heat of the wire 66. The terminal 150 is interconnected by the switch 105 to give a high heat impulse current flow while the interconnection of the switch 105 with the terminal 149 gives a lower current flow to the wire 66. It is during the high heat impulse that the wire 66 performs its sealing function as will be presently described.

A wire 161 leads from the wire 130 to a switch 104 operated by the cam 91, and the closing of this switch 104 completes a circuit through a relay 162 through a wire 163 to the switch 164 which is normally open. This switch is closed upon the closing of the bag length determining switch 103 when operated by the cam 102 through the wires 166 and 167 upon completion of the circuit through the relay 162 through the wires 166 and 167, and the wire 168 leading through the manual switch 169 to the wire 143.

The photoelectric cell 109, upon the nonregsitration of the printed matter as above indicated, operates through the amplifying and switching box 170 which is connected across the wires 166 and 167 to give selectively an audible or visual signal (not shown).

The control of the magnetic clutch and the magnetic brake is had as follows. A switch 171 under the control of the relay 162, normally closed, controls the circuit composed of the wire 172 to a bridge 173, at the corner 174 thereof and from the corner 175, wires 176, 177 through the winding 178 of the brake 76, the wire 179, through a variable resistance 180, and the wire 181. The bridge 173 receives alternating current from the wire 167 through the wire 182 to the corner 183 and the wire 184 from the wire 161 to the corner 185. Thus the brake winding 173 is supplied with direct current.

A third switch 186, normally open, connected by one side to the wire 172, through the wire 187, completes a circuit from the wire 172 through the switch, wire 188, switch 107 operated by the cam 94, this switch 197 being normally closed, the wire 189, variable resistance 190, the resistance 191 of the clutch 75, and the wire 192 to the wire 176. The switch 107 when closed is used to bypass a fixed resistance 193 connected across the switch. When the switch 107 is open, then the clutch is not only de-energized, but the brake 176 is energized with the closed switch 171. The setting of the two variable resistances 180 and 190 will provide this control.

The photoelectric cell 109 control energizes the clutch brake relay 162. The relay 162 normally remains energized while the switch 104 is closed under the operation of cam 91. The clutch 75 is de-energized and simultaneously the brake 76 is energized. When the clutch is energized, the seal bar assembly 39 is turned, but it can only turn one complete revolution. The cam 192 operates the switch 105 to control the voltage on the sealing wire 66, doing so only during the actual sealing. The cam 94 controlling the switch 107 increases the resistance to the clutch 75 winding 191 to allow the clutch to slip while the seal bar is in contact with the seal roller 30. The seal bar and the roller 30 rotate together during the sealing operation and then the speed of turning of the seal bar is increased following that sealing operation to bring the assembly 39 around to its neutral holding position. Then cam 91 operates to allow the switch 104 to open and thus retain the assembly 39 in its initial starting position for the next sealing operation.

Referring to FIG. 10, primarily, the actual bag sealing operation is as follows. The tape 23 is fed to come over the roller 30 and continue there beyond to lap onto the tape belts 120, to give a precise length from the point of tendency of the tape 23 on the top side of the roller 30 for the required bag lengths. The minute that length is reached, the sealing bar assembly 39 is rotated counter-clockwise as viewed in FIG. 10 to bring the lower edges 63 and 64 down compressibly against the tape 23 in turn forcing it against the roller 30. The roller 30 is purposely covered with a heat resistant material such as the presently known Teflon plastic. When the edges 63 and 64 have compressibly engaged the tape 23, the wire 66 is brought down against the tape 23 to extend entirely there across, the member 51 then rising a short distance relatively above the shaft 40 to hold the yielding pressure against the tape 23 and of the wire 66 which is heated to its maximum required temperature, the tape 23 being gripped on both sides of the wire contact with the tape. The clutch 75 is automatically released and the brake 76 becomes effective allowing the assembly 39 to be then rotated due to the contacts of the edges 63 and 64, during the lost motion period between the contact of the arm 81 against the side 50, and upon the continued turning by the roller 30 of the assembly 39, the bar assembly 39 is tipped forwardly to bring the edges 63 and 64 and also the wire 66 out of the path of the oncoming tape which of course never stops in its travel.

The dwell period of the wire 66 when heated upon the tape 23 is sufficient to actually melt the tape 23, and cause the tape edges at the sides of that wire "cut" through to be melted together, forming a closed side of the bag. Also simultaneously the edge of the oncoming tape is sealed in that operation so that the next sealing of the wire 66 on the tape 23 leaves the opposite side of that bag sealed, and so on. Belt roller 122 has its top side, and the top sides of the belts 120 slightly below up to a half inch, of the top side of the seal roller 30 so that the individual bags coming from the seal roller 30 may be caught on the belts 120 and travel under the pressure rollers for positive feed, following which the bags 200 must be carried along on the top sides of the belt 120 in spaced relation, the spacing there between being that set up by reason of a slightly faster travel of the pulley 122 than that of the seal roller 30. The advantage of the separate, spaced apart belts 120 is that the formed bags 200 are allowed to cool along sealed edges so that the material that has been actually melted may congeal and form the finished, tight seal required. From the belts 120 the individual bags 200 may go to a stacking arrangement which is not shown and is not a part of the present invention.

It is thus to be seen that I have provided a continuously operating machine where the travel of the tape 23 is continuously carried through the machine without stoppage at any time thereof for a sealing operation. The sealing operation is made on the "fly" as has above been indicated. Incidentally, while not specifically above mentioned, the diameter of the wire 66 may be varied depending upon the thickness of tape, a double thickness, and its width. For small bags, a continuous voltage of around 8 is sufficient, and this voltage is raised upon the heat impulse switch 105 acting to give the higher voltage. That voltage is merely as is indicated, an impulse voltage. The wire itself never becomes visibly hotter than to give at the most a red appearance. The wire 66 is of that material and diameter which will just give the necessary heat entirely there along to make the melting of the two plies of tape.

Various folding of the tape may be employed, such as using a flattened tubular tape folded on both sides, and then split down the center to form two separate tape lengths each folded along common edges so that the final bag openings are left between the cut edges of the two strips.

Therefore, while I have herein shown and described my invention into one particular form in minute detail, it is obvious that structural changes may be employed without departing from the spirit of the invention.

I claim:

1. The method of forming containers from a length of two ply plastic film, which method comprises
    continuously moving the film through a zone;
    heating the film in said zone on a line laterally thereacross, melting both plies to divide off a length from the oncoming film;
    said heating causing the edges of the two plies on each side of said line to flow together into a sealing state both at the end of the oncoming film and at the divided off length;
    pulling the length away from said line while the film is still molten at a speed slightly exceeding that of the film;
    said method forming the length to have a heat sealed edge along one side, a heat sealed edge along the opposite side.

2. The method of dividing a multi-ply plastic film into two parts, comprising
    melting the film along a line of intended division between two parts; and
    pulling one part from the other creating separation of the parts one from the other within the melted line; portions of the melted film clinging to the respective opposing edges of the two parts which edges define the boundaries of the melted film portion.

3. The method of claim 2, in which said film is travelling in continuous motion; and said one part is pulled from the other at a greater speed than that of travelling film.

4. A machine for making containers from a tape of a two ply length of plastic film, which machine comprises
    a seal roller;
    means continuously feeding the tape over said roller;
    a seal bar assembly revolubly mounted over said roller;
    an electrically heated element extending along the underside of said assembly;
    drive means responsive to a predetermined length of tape passing over said roller, rotating said assembly to bring said element around in the direction of tape travel and pressed against the tape;
    means releasing said drive means allowing said assembly to be continued in said rotation by pressure of said roller theretoward carrying said element away from the tape and roller;
    means supplying electric current to said element when pressed against the tape and melting it and dividing off a length from the tape; and
    means engaging and withdrawing the length from the seal roll.

5. The structure of claim 4, in which said assembly carries
    a pair of spaced apart tape pressure members, between which said element is carried; and
    yielding means urging said members against said tape, and between which said tape is contacted by said element, said seal bar being continued in said rotation by pressure of the roll theretoward carrying said element around away from the tape on the roll;
    means supplying current to said element during contact with said tape and discontinuing upon removal of the element therefrom.

6. A continuously traveling, two ply plastic film container making comprising
    means for holding a roll of plastic film;
    a film draw roller;
    a film pressure roller substantially tangential to the draw roller;
    said film passing between and advanced thereby from said film roll;
    a seal roller driven at a fixed speed in relation to said draw roller and over which said film is directed from the draw roller;
    means for driving said draw and seal rollers;
    a heater bar assembly rotatively mounted over said seal roller;
    a shaft on which said bar assembly is revolubly carried;
    means driving said shaft;
    clutch means selectively connecting said bar assembly to said shaft;
    brake means selectively holding said bar assembly from turning with said shaft;
    an electric heater element carried across said bar assembly to contact said film on said seal roller upon the bar assembly being revolved;
    and an electric circuit actuated by rotation of said shaft actuating said clutch and said brake in sequence to cause the bar assembly to revolve in timed relation to a fixed length of film passing over said seal roller to bring said element into contact with said film simultaneously energizing the element to provide sufficient heat to melt the film along the contact of the element therewith, release said clutch and let the contact of the bar assembly against the film on the seal roller continue to revolve the bar assembly until it is entirely free of said contact, energize said brake to arrest further turning of the bar assembly; and
    means for pulling the end of the film melted off from the moving film length, as a finished container sealed along the melted line.

7. The structure of claim 6 in which there are
    a pair of spaced apart rollers around which said film travels between the roll of film to said draw roller;
    a third roller carried by a rocker frame entering between said pair of rollers to bear against said film;
    rocking of said frame varying zones of the film for desired location thereof on said containers.

8. The structure of claim 6, in which there is
    a container length determining device actuated by said draw roller driving means;
    a switch actuated by said determining device and embodied in said circuit to determine the stationary time dwell of said heater bar until the desired length of film has traversed the seal roller for the required container length.

9. For a machine making individual containers from a continuously travelling two-ply plastic tape, a heater bar assembly, comprising
    a bearing member;
    a pair of spaced apart legs downturned from said member;

a body slidingly carried between sad legs;

central pressure bars attached to said body and entering between said legs;

an electrical and heat insulation member separating and terminating above lower edges of said bars;

an electrical resistance heat wire fixed by one end to said member and extending along and spaced from said insulating member to a second end portion;

a rocker member pivotally carried by said bearing member and engaging said second end portion of the wire;

spring means rocking said rocker member to tension said wire;

a pair of tape pressure members, one carried by each of said legs, and having lower edges, one on each side of said wire; and yielding means normally urging said legs downwardly relative to said body.

References Cited

UNITED STATES PATENTS

| | | | |
|---|---|---|---|
| 2,347,439 | 4/1944 | Shea et al. | 156—583 XR |
| 2,726,706 | 12/1955 | Hakomaki | 156—515 |
| 3,083,757 | 4/1963 | Kraft et al. | 156—515 |

EARL M. BERGERT, *Primary Examiner.*

H. F. EPSTEIN, *Assistant Examiner.*

U.S. Cl. X.R.

156—290, 515; 225—2